United States Patent [19]

Schmidberger

[11] 4,174,260
[45] Nov. 13, 1979

[54] COMPOUND CELL FOR HIGH-TEMPERATURE ELECTROCHEMICAL REACTIONS

[75] Inventor: Rainer Schmidberger, Bermatingen, Fed. Rep. of Germany

[73] Assignee: Dornier Systems GmbH, Friedrichshafen, Fed. Rep. of Germany

[21] Appl. No.: 950,364

[22] Filed: Oct. 11, 1978

[30] Foreign Application Priority Data

Oct. 14, 1977 [DE] Fed. Rep. of Germany ....... 2746172

[51] Int. Cl.² ........................... C25B 9/00; H01M 8/12
[52] U.S. Cl. .................................. 204/260; 204/265; 429/31; 204/266
[58] Field of Search ............... 204/260, 263, 295, 129, 204/265–266; 429/30–33

[56] References Cited

U.S. PATENT DOCUMENTS

| 3,402,230 | 9/1968 | White, Jr. .......................... 429/31 X |
| 3,479,274 | 11/1969 | Bott ..................................... 204/260 |
| 3,668,010 | 6/1972 | Fally et al. ........................... 429/31 |
| 3,776,777 | 12/1973 | Houpert et al. ....................... 429/33 |

FOREIGN PATENT DOCUMENTS 2614727 10/1977 Fed. Rep. of Germany ............ 429/31

Primary Examiner—John H. Mack
Assistant Examiner—D. R. Valentine
Attorney, Agent, or Firm—Toren, McGeady and Stanger

[57] ABSTRACT

A compound cell for performing an electrochemical reaction at high temperature consists essentially of hollow, cylindrical bodies of a ceramic electrolyte, rings of an electronically conductive material coaxially interposed between each pair of electrolyte bodies, annular layers of ceramic insulating material bonding each ring to at least one of the two adjacent electrolyte bodies, the bodies, rings, and annular layers being diffusion welded to each other to form a cylindrical, gas-tight tube. A pair of electrode layers is associated with each electrolyte body, one layer of the pair covering the associated body inside the tube and conductively engaging one of the two adjacent rings, the other electrode layer of the pair covering the associated body outside the tube and conductively engaging the other adjacent ring.

5 Claims, 5 Drawing Figures

COMPOUND CELL FOR HIGH-TEMPERATURE ELECTROCHEMICAL REACTIONS

This invention relates to electrochemical reactions at high temperature, and particularly to a compound cell for performing such reactions.

More specifically, the invention relates to a compound cell including a plurality of series-connected units, each unit consisting of two electrodes and a solid electrolyte interposed between the electrodes. Series-connected units of the type described are being employed in fuel cells and electrolytic cells operating at temperatures in excess of 600° C. The invention will be described with reference to the electrolytic production of hydrogen, but it is equally applicable to the direct generation of electric current from a fuel and an oxidant at similar temperatures. The maximum potential that may be applied to an individual unit is approximately $1 \pm 0.3$ V, and it is necessary to arrange a plurality of units in series circuit for economical operation.

It has been proposed [W. Fischer et al, Chemie-Ingenieur-Technik 44 (1972), No. 11, 726] to assemble individual units of conically tapering tubular shape coaxially in such a manner that an electrode on the outer surface of the conically tubular electrolyte in one unit engages an electrode on the inner surface of the next unit. An adequate mechanical and electrical connection between the successive units is provided by a connector material inserted at the junction in the form of an aqueous suspension of solid particles which are then sintered. Shrinkage cannot be avoided during sintering, and the connection between successive units permits leakage and recombination of the gases present on opposite sides of the electrolyte so that the efficiency of the unit is impaired.

It has further been proposed in French Pat. No. 1,585,403 to assemble identical, tubular, cylindrical bodies of a ceramic electrolyte with interposed connectors of noble metals, such as platinum, which connect an electrode on the internal face of one tubular electrolyte body with an outer electrode on an adjacent electrolyte body. In order to maintain the necessary gas-tight seal at the junctures of electrolyte bodies and connectors, the assembly must be kept under axial compressive stress during operation.

It is a primary object of this invention to provide a compound cell of multiple units similar to those of the French patent which is self-supporting, mechanically stable, and gastight in the absence of externally applied pressure.

With this object and others in view, as will hereinafter become apparent, the compound cell of the invention includes a plurality of hollow, cylindrical bodies of a ceramic electrolyte capable of conducting oxygen ions and substantially impervious to gases, and a plurality of rings of an electronically conductive material substantially impervious to gases. The two radially extending end faces of each of the bodies are bonded gastight in axial alignment to respective end faces of two axially adjacent rings, whereby the bodies, rings, and bonds jointly constitute a self-supporting, gas-tight tube. A pair of electrode layers is associated with each body. One of the electrode layers is superimposed on the inner axial face of the associated body and conductively engages one of the two adjacent rings in the tube. The other electrode layer is superimposed on the outer axial face of the associated body and conductively engages the other adjacent ring outside the tube.

Other features, additional objects, and many of the attendant advantages of this invention will readily be appreciated as the same becomes better understood by reference to the following detailed description of preferred embodiments when considered in connection with the appended drawing in which.

Figure 1:
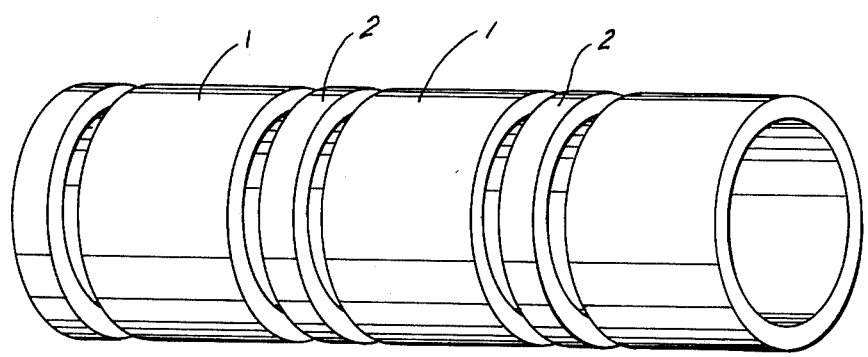
FIG. 1 shows elements of a compound cell of the invention in an exploded, sectional, perspective view.

Referring initially to FIG. 1, there are shown structural elements of three units of a compound cell of the invention. Identical cylindrical tubes 1 alternate with identical, cylindrical rings 2 having the same inner and outer diameters as the tubes. The tubes 1 consist of zirconium dioxide stabilized with 9% $Y_2O_3$, a known electrolyte material permeable to oxygen ions for use in high temperature cells for the electrolysis of water. The rings 2 consist of a sintered mixture of $La_{0.5}Ca_{0.5}MnO_3$ and $(CeO_2)_{0.995}(V_2O_5)_{0.005}$ which has high electronic conductivity at partial oxygen pressures between $10^{-5}$ bar and one bar, as well as below $10^{-5}$ bar, at operating temperatures of 600° C. and more. Other materials having corresponding properties have been disclosed in the copending, commonly owned application Ser. No. 928,170, filed July 26, 1978.

Figure 2:
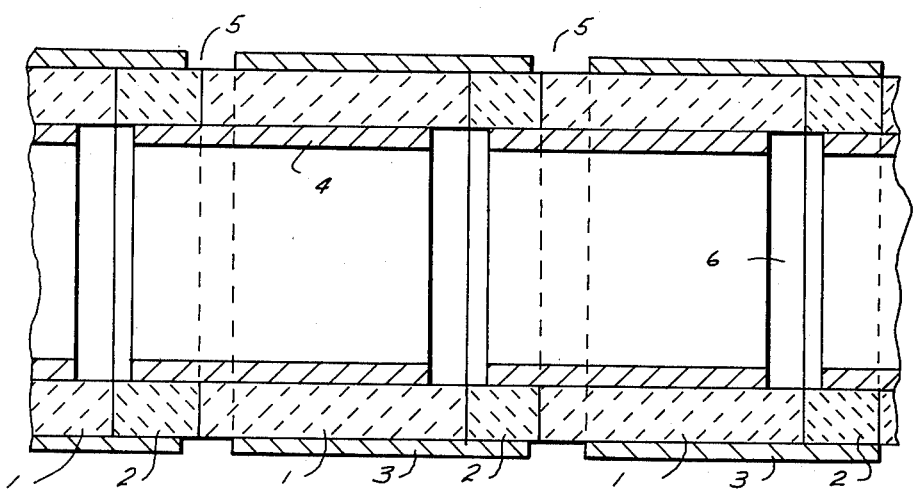
FIG. 2 illustrates a compound cell of the invention in fragmentary section on its axis.
Figure 3:
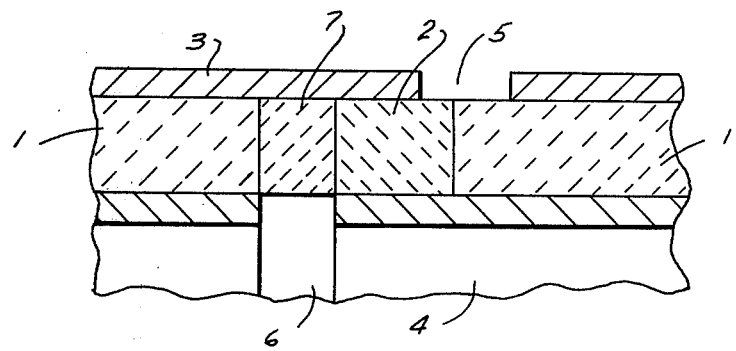
FIG. 3 shows a modified detail for the device of FIG. 2 on a larger scale.

In the assembled compound cell illustrated in FIGS. 2 and 3, a stack of alternating tubes 1' and rings 2, not drawn to scale, carries an outer tubular electrode 3 and an inner tubular electrode 4 associated with each tube 1. The outer, positive electrode 3 covers a major portion of the associated tube 1 and is conductively connected to one of the two rings 2 which connect the associated tube 1 to the two adjacent other tubes 1 respectively. The inner, negative electrode 4 is axially offset from the outer electrode associated with the same tube 1. It covers much of that tube and is conductively connected to the inner face of the other adjacent ring 2. An annular gap 5 separates each pair of axially outer electrodes 3 and a similar gap 6 the inner electrodes. Surface portions of a tube 1 and of a ring 2 are exposed in each gap 5, 6.

The electrodes 3, 4 are porous and consist respectively of $La_{0.5}Ca_{0.5}MnO_3$ and a nickel-cermet containing equal weights of nickel particles and of stabilized zirconia. The electrode materials are known in themselves and may be replaced by known equivalents. The electrode layers are each approximately 0.5 mm thick.

The number of units in the compound cell illustrated in FIG. 2 may be chosen to suit the potential of an available source of direct current, the two poles of the current source being connected to the last inner electrode at one end of the compound cell and to the last outer electrode at the other end.

In assembling the compound cell, each tube 1 and ring 2 is prepared by compacting the corresponding pulverulent material in a mold having the desired shape, and by separately sintering each green compact at a temperature of approximately 1400° C. A tube 1 and a ring 2 are secured to each other by means of a very thin layer of temporary organic binder which bonds planar, annular end faces of the tube and ring to each other in precise axial alignment. The end of the inner axial face of the tube 1 remote from the ring 2 is coated with a conventional stop-off lacquer consisting of organic material only, and a slurry of nickel-cermet in water or other solvent is applied to the inner, axial face portions of the adhesively connected tube and ring. As many sub-assemblies of a tube, a ring, and a negative electrode layer are prepared as there will be units in the assembled cell, and the several sub-assemblies are adhesively fastened to each other in axial alignment. The stack so formed is heated under axial pressure to a temperature sufficient to volatilize the binder and the stop-off lacquer, whereby annular portions of the inner electrode material drop off to leave the gaps 6. Heating under axial pressure is continued until the materials of the tubes and adjacent rings are welded to each other by diffusion, thereby sintering the nickel-cermet to the internal faces of the tubes and rings.

The unitary, gas-tight body of alternating tubes 1 of ceramic electrolyte and rings 2 of electronically conductive, ceramic, interconnecting material is covered with annular areas of stop-off lacquer covering terminal portions of the tubes 1 axially coextensive with portions of the negative electrodes 3, and a slurry of $La_{0.5}Ca_{0.5}MnO_3$ is sprayed over the outer surface of the tubular body. The deposited electrode material is dried and sintered, thereby volatilizing the stop-off lacquer and releasing the superimposed electrode material so that the gaps 5 are formed.

When steam is admitted to the bore of the tubular body partly shown in FIG. 2, and an adequate potential is applied to the terminal electrode, the steam is electrolyzed as oxygen ions migrate through the electrolyte tubes 1 to the outer electrodes 3, and hydrogen accumulates in the bore in a manner well known in itself. Current flows sequentially from the nonillustrated positive terminal of the current source to the outer electrode 3 of a first unit in the illustrated compound cell, through the connected ring 2 to the inner electrode 4 of the second unit, through the electrolyte tube 1 of the second unit to the associated outer electrode 3, and thence through another ring 2 to the inner electrode 4 of the third unit, the process being repeated until current flows from the inner electrode of the last unit to the negative terminal of the current source. Oxygen and hydrogen are recovered respectively from the bore and from the outer surface of the compound cell in a manner known in itself.

The cell of the invention described above with reference to FIGS. 1 and 2 has been found to operate satisfactorily at relatively low current densities. Because the two radial end faces of each ring 2 are bonded to corresponding end faces of two electrolyte tubes 1, there is an electrolytic action at the interfaces. The oxygen concentration at one interface is reduced, and oxygen ions are discharged at the other interface to form molecular oxygen. If oxygen is generated at a rate higher than it can diffuse through the practically gas-impervious, adjacent solid materials, it may impair the bonds between tubes 1 and rings 2. If gas diffusion is negligible, the partial oxygen pressure is determined by the applied potential.

The reduction of oxygen ion concentration at the other interface may cause partial hydrogenation of the electrolyte material and partial electronic conductivity, and initiate reactions of the electrodes with the materials of the rings 2 and the electrodes 3, 4. The resulting problems are known (see, for example, B.C.H. Steele in "Electrode Processes in Solid State Ionics," 1976, D. Reidel Publishing Company).

The difficulties which can occur in compound cells of the invention because of the gas-impermeability and electronic conductivity of the material in the rings 2 can be avoided, and higher current densities may be resorted to if the rings 2 are electrically insulated from one or both adjacent tubes 1.

In the embodiment of the invention partly illustrated in FIG. 3 each ring 2 is bonded to one adjacent electrolyte tube 1 by a direct diffusion weld, and no provisions are made for avoiding the reduction of oxygen concentration at the interface. The other radial end face of each ring 2 is axially separated from the associated electrolyte tube 1 by an annular layer 7 of rectangular cross section equal in internal and external diameter to the tubes 1 and rings 2. The layer 7 consists of ceramic, electrically insulating material, such as $La_{0.95}Mg_{0.05}Cr_{0.5}Al_{0.5}O_3$, whose thermal expansion characteristics match those of the ceramic materials in the tubes 1 and rings 2. The annular layer 7 is prepared by compressing the pulverulent mixed oxide material in a mold of suitable shape, and sintering the green compact until gas-tight before it is assembled with the adjacent tube 1 and ring 2 by diffusion welding under axial pressure in the manner described above with reference to FIG. 2.

Figure 4:
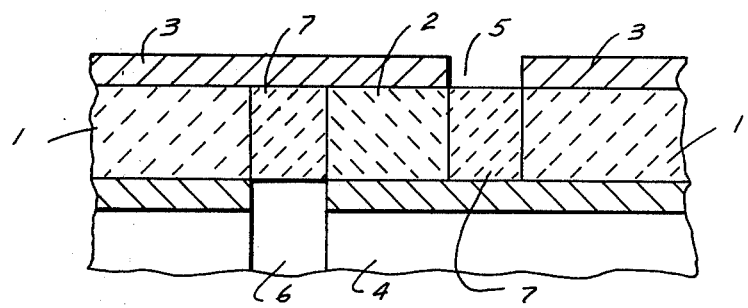
FIGS. 4 and 5 illustrate additional modified cells of the invention in respective views corresponding to that of FIG. 3.

If it is preferred to avoid electrolytic action at both end faces of each ring 2, insulating layers 7 are interposed axially between both end faces of each ring 2 and the opposite end faces of the two adjacent tubes 1 in the manner illustrated in FIG. 4.

Figure 5:
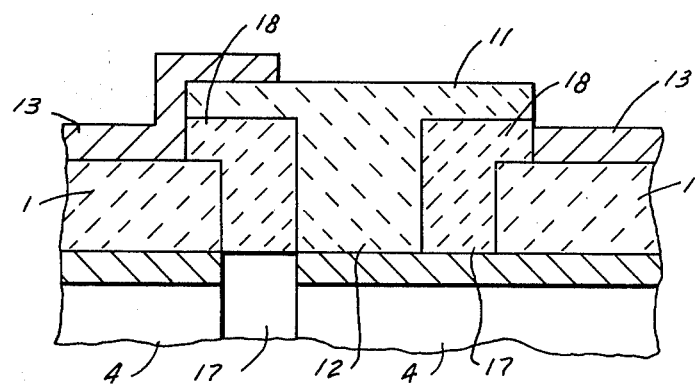

If the use of a temporary, volatile binder during assembly of the tubes 1 and rings 2 with or without annular insulating layers 7 is undesirable for any reason, the several elements of the stack may be centered coaxially by suitably modifying the shapes of the elements in a manner exemplified in FIG. 5.

The tubes 1 of ceramic electrolyte and inner electrodes 3 of the modified embodiment are identical with the corresponding elements described above. The annular layers 17 of electrically insulating material are L-shaped in cross section, and their outer diameters are greater than that of the tubes 1 so that the axial ends of each tube 1 are conformingly enveloped by an axial flange portion 18 of a layer 17. The rings 12 of electronically conductive material which connect the inner electrodes 14 to the outer electrodes 13 are T-shaped in cross section so that axial flange portions 11 of each ring 12 envelop the flange portions 18 of the two associated insulating layers 17 which bond the ring 12 to the two adjacent tubes 1 respectively.

The tubes 1, layers 17, and rings 12 are prepared individually from pulverulent materials by compacting and sintering, and may then be assembled without the use of organic binder and prior to diffusion welding in a manner obvious from the afore-described assembly method for the compound cell of FIG. 2. After each ring 12 is bonded to the two adjacent tubes 1 by two layers 17 of insulating material, the outer electrode 13 is applied by spraying of a slurry over the partly stopped-off tubular structure so as to conform to the flanged shape of the ring 12.

As partly indicated above, the ceramic materials constituting the illustrated compound cells are known in themselves and have known equivalents of different chemical composition. Ceria is another known, solid electrolyte for high-temperature electrolysis of water, and many insulating ceramic materials are known. Those skilled in the art will readily select combinations of other suitable ceramics according to their matching thermal expansion coefficients up to the usual operating temperature of 700° to 1000° C.

The dimensions of the constituent elements of the compound cell of the invention are not critical, nor is the number of cell units. In an actual embodiment, 60 tubes 1 having each an axial length of 10 mm, an outer diameter of 15 mm, and a wall thickness of approximately 0.6 mm were assembled with correspondingly dimensioned tubes 2, 12 and insulating layers 7, 17.

It should be understood, therefore, that the foregoing disclosure relates only to preferred embodiments and that it is intended to cover all changes and modifications of the examples of the invention herein chosen for the purpose of the disclosure which do not constitute departures from the spirit and scope of theinvention set forth in the appended claims.

What is claimed is:

1. A compound cell for performing an electrochemical reaction at a temperature above 600° C. which comprises:
   (a) a plurality of hollow, cylindrical bodies of a ceramic electrolyte capable of conducting oxygen ions and substantially impervious to gases;
   (b) a plurality of rings of an electronically conductive material substantially impervious to gases, each of said bodies and each of said rings having an axis, two radially extending end faces, and inner and outer axially extending faces;
   (c) gas-tight bonding means bonding the two end faces of each of said bodies in axial alignment to respective end faces of two axially adjacent rings, said bonding means, said bodies and said rings jointly constituting a self-supporting, gas-tight tube; and
   (d) a pair of electrode layers associated with each of said bodies, one of said electrode layers being superimposed on the inner axial face of the associated body and conductively engaging one of the two adjacent rings in said tube, the other electrode layer being superimposed on the outer axial face of the associated body and conductively engaging the other adjacent ring outside said tube.

2. A cell as set forth in claim 1, wherein said inner, axially extending faces of said bodies and of said rings are cylindrical and of equal diameter.

3. A cell as set forth in claim 1, wherein said bonding means include an annular layer of ceramic insulating material.

4. A cell as set forth in claim 1, wherein said rings consist essentially of at least one first ceramic material having an electronic conductivity of at least one mho/cm at all ambient partial oxygen pressures between $10^{-5}$ bar and one bar at said temperature, and at least one second ceramic material having an electronic conductivity of at least one mho/cm at all ambient partial oxygen pressures lower than $10^{-5}$ bar at said temperature, said first and second materials being conductively bonded to each other.

5. A cell as set forth in claim 1, further comprising cooperating centering means on said bodies and said rings engaging each other for maintaining coaxial alignment of said bodies and of said rings in the absence of said bonding means.

* * * * *